United States Patent
Liu

(10) Patent No.: US 12,007,900 B2
(45) Date of Patent: Jun. 11, 2024

(54) DATA ACCESSING METHOD AND DATA ACCESSING SYSTEM CAPABLE OF PROVIDING HIGH DATA ACCESSING PERFORMANCE AND LOW MEMORY UTILIZATION

(71) Applicant: Realtek Semiconductor Corp., HsinChu (TW)

(72) Inventor: Chih-Hao Liu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/984,211

(22) Filed: Nov. 9, 2022

(65) Prior Publication Data
US 2024/0012761 A1   Jan. 11, 2024

(30) Foreign Application Priority Data
Jul. 8, 2022  (TW) .................................. 111125763

(51) Int. Cl.
*G06F 12/0882* (2016.01)
*G06F 12/0804* (2016.01)
*G06F 12/126* (2016.01)

(52) U.S. Cl.
CPC ...... *G06F 12/0882* (2013.01); *G06F 12/0804* (2013.01); *G06F 12/126* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41;
(Continued)

(56) References Cited

U.S. PATENT DOCUMENTS 5,261,068 A * 11/1993 Gaskins .............. G06F 12/0607
365/230.02
5,325,509 A *  6/1994 Lautzenheiser ..... G06F 11/1435
711/E12.04
(Continued)

OTHER PUBLICATIONS

R. I. Davis, S. Kollmann, V. Pollex and F. Slomka, "Controller Area Network (CAN) Schedulability Analysis with FIFO Queues," 2011 23rd Euromicro Conference on Real-Time Systems, Porto, Portugal, 2011, pp. 45-56, doi: 10.1109/ECRTS.2011.13. (Year: 2011).*
(Continued)

*Primary Examiner* — Daniel C. Chappell
(74) *Attorney, Agent, or Firm* — Winston Hsu

(57) ABSTRACT

A data accessing method includes providing a first memory including a plurality of memory pages, acquiring a usage order value of each memory page of the plurality of memory pages, acquiring a first usage order value having a highest priority from a plurality of usage order values corresponding to the plurality of memory pages in the first memory, updating the first memory after a first memory page having the first usage order value is used, acquiring a second usage order value having a highest priority from the updated first memory after the first memory is updated, and using a second memory page having the second usage order.

18 Claims, 4 Drawing Sheets

(58) Field of Classification Search
CPC ......... G06F 17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | | | |
|---|---|---|---|---|---|
| 5,404,485 | A * | 4/1995 | Ban | ................... | G06F 12/0246 |
| | | | | | 711/202 |
| 5,535,156 | A * | 7/1996 | Levy | ................... | G11C 11/39 |
| | | | | | 365/175 |
| 5,627,779 | A * | 5/1997 | Odake | ................ | G11C 16/0416 |
| | | | | | 365/185.12 |
| 5,745,407 | A * | 4/1998 | Levy | ..................... | G11C 11/56 |
| | | | | | 365/174 |
| 5,889,949 | A * | 3/1999 | Charles | ................. | H04N 21/40 |
| | | | | | 348/E9.037 |
| 5,982,360 | A * | 11/1999 | Wu | ...................... | H04N 19/42 |
| | | | | | 348/E5.006 |
| 6,564,304 | B1 * | 5/2003 | Van Hook | ........... | G06F 13/1626 |
| | | | | | 710/39 |
| 7,017,023 | B1 * | 3/2006 | Knight | ............... | H04L 41/0806 |
| | | | | | 711/170 |
| 7,043,619 | B1 * | 5/2006 | Knight | ................... | G06F 3/067 |
| | | | | | 711/170 |
| 7,085,895 | B2 * | 8/2006 | Kishi | .................. | G06F 3/0686 |
| | | | | | 711/158 |
| 7,908,434 | B2 * | 3/2011 | Kobayashi | ........... | G06F 12/123 |
| | | | | | 710/39 |
| 8,996,789 | B2 * | 3/2015 | Benhase | ............ | G06F 12/0804 |
| | | | | | 711/119 |
| 11,157,418 | B2 * | 10/2021 | Gupta | ................. | G06F 12/0846 |
| 11,693,582 | B2 * | 7/2023 | Madraswala | ......... | G06F 3/0655 |
| | | | | | 711/154 |
| 11,715,530 | B2 * | 8/2023 | Liikanen | ............ | G11C 16/3404 |
| | | | | | 365/189.011 |
| 11,726,929 | B2 * | 8/2023 | Lee | ........................ | G06F 9/505 |
| | | | | | 710/5 |
| 2005/0169038 | A1 * | 8/2005 | Inoue | ................. | G11C 13/0004 |
| | | | | | 365/148 |
| 2006/0041782 | A1 * | 2/2006 | Ali | ...................... | G06F 11/1662 |
| | | | | | 714/E11.089 |
| 2007/0258341 | A1 * | 11/2007 | Lin | ...................... | G11B 7/1267 |
| | | | | | 369/53.26 |
| 2008/0056012 | A1 * | 3/2008 | Erez | .................... | G06F 12/0246 |
| | | | | | 711/E12.008 |
| 2008/0225581 | A1 * | 9/2008 | Yamane | .............. | G11C 11/1659 |
| | | | | | 365/171 |
| 2009/0024736 | A1 * | 1/2009 | Langille | .............. | H04L 41/5025 |
| | | | | | 709/224 |
| 2009/0282186 | A1 * | 11/2009 | Mokhlesi | ........... | G11C 16/0483 |
| | | | | | 711/E12.001 |
| 2010/0046286 | A1 * | 2/2010 | Choi | ........................ | G11C 7/18 |
| | | | | | 365/163 |
| 2010/0211737 | A1 | 8/2010 | Flynn | | |
| 2010/0265764 | A1 * | 10/2010 | Yoo | ........................ | G11C 16/10 |
| | | | | | 365/185.02 |
| 2013/0194870 | A1 * | 8/2013 | Lee | .................... | G11C 16/0483 |
| | | | | | 365/185.11 |
| 2013/0290343 | A1 * | 10/2013 | Kruglick | ............. | G06F 16/2228 |
| | | | | | 707/E17.049 |
| 2014/0229699 | A1 * | 8/2014 | Gurgi | .................... | G06F 3/0611 |
| | | | | | 711/167 |
| 2014/0229755 | A1 * | 8/2014 | Kris | ........................ | H02J 1/102 |
| | | | | | 713/340 |
| 2015/0145873 | A1 * | 5/2015 | Akenine-Moller | ..... | G06T 11/40 |
| | | | | | 345/506 |
| 2015/0261617 | A1 * | 9/2015 | Choi | .................. | G11C 16/3418 |
| | | | | | 714/6.22 |
| 2016/0133323 | A1 * | 5/2016 | Kwon | ............... | G11C 13/0069 |
| | | | | | 365/148 |
| 2016/0180957 | A1 * | 6/2016 | Nishiyama | ............ | G11C 16/14 |
| | | | | | 365/185.21 |
| 2021/0081326 | A1 | 3/2021 | Curewitz | | |
| 2023/0141986 | A1 * | 5/2023 | Nikuie | ................. | G06F 3/0659 |
| | | | | | 711/103 |

OTHER PUBLICATIONS

R. I. Davis and N. Navet, "Controller area network (CAN) schedulability analysis for messages with arbitrary deadlines in FIFO and work-conserving queues," 2012 9th IEEE International Workshop on Factory Communication Systems, Lemgo, Germany, 2012, pp. 33-42, doi: 10.1109/WFCS.2012.6242538. (Year: 2012).*

R. Gupta and M. L. Soffa, "Priority based data flow testing," Proceedings of International Conference on Software Maintenance, Opio, France, 1995, pp. 348-357, doi: 10.1109/ICSM.1995.526556. (Year: 1995).*

R. Singh, G. K. Kamath and P. R. Kumar, "Optimal Information Updating based on Value of Information," 2019 57th Annual Allerton Conference on Communication, Control, and Computing (Allerton), Monticello, IL, USA, 2019, pp. 847-854, doi: 10.1109/ALLERTON.2019.8919810. (Year: 2019).*

* cited by examiner

DATA ACCESSING METHOD AND DATA ACCESSING SYSTEM CAPABLE OF PROVIDING HIGH DATA ACCESSING PERFORMANCE AND LOW MEMORY UTILIZATION

BACKGROUND OF THE INVENTION

1. Field of the Invention

The present invention illustrates a data accessing method and a data accessing system, and more particularly, a data accessing method and a data accessing system capable of providing high data accessing performance and low memory utilization.

2. Description of the Prior Art

With the development of computer technology, various types of high-density storage devices are gradually adopted. For example, a memory having high-density data storage capability is popularly used in a computer. In general, the memory can be categorized into a volatile memory and a non-volatile memory according to storage characteristics. Specifically, the data stored in the volatile memory disappears after a power supply of the volatile memory is interrupted. However, the data stored in the non-volatile memory can be preserved even when the power supply is turned off. Once the power supply is turned on again, the data stored in the non-volatile memory can be re-accessed.

Currently, when the data of the memory is accessed, a linked list structure is often used for storing pointers of packets. The linked list structure is a common data structure. The linked list structure can use nodes for logging, indicating, and storing data. The linked list structure can further use an index of each node for pointing to the next node. Therefore, the linked list structure can link a plurality of nodes. However, the time complexity for searching data nodes in the linked list structure is equal to O(N). Further, the linked list structure requires a large memory capacity for saving indices of all nodes. Therefore, to develop a data accessing method capable of providing high data accessing performance and low memory utilization is an important issue.

SUMMARY OF THE INVENTION

In an embodiment of the present invention, a data accessing method is disclosed. The data accessing method comprises providing a first memory comprising a plurality of memory pages, acquiring a usage order value of each memory page of the plurality of memory pages, acquiring a first usage order value having a highest priority from a plurality of usage order values corresponding to the plurality of memory pages in the first memory, updating the first memory after a first memory page having the first usage order value is used, acquiring a second usage order value having a highest priority from the updated first memory after the first memory is updated, and using a second memory page having the second usage order.

In another embodiment of the present invention, a data accessing system is disclosed. The data accessing system comprises a first memory, a receiver, a transmitter, and a processor. The first memory comprises a plurality of memory pages and is configured to save data. The receiver is configured to receive input data and write the input data to the first memory. The transmitter is configured to read output data from the first memory. The processor is coupled to the first memory, the receiver, and the transmitter and configured to control the first memory, the receiver, and the transmitter. The processor acquires a usage order value of each memory page of the plurality of memory pages. The processor acquires a first usage order value having a highest priority from a plurality of usage order values corresponding to the plurality of memory pages in the first memory. The transmitter and the receiver access data through a first memory page having the first usage order value. The processor updates the first memory after the first memory page having the first usage order value is used. The processor acquires a second usage order value having a highest priority from the updated first memory after the first memory is updated. The transmitter and the receiver access data through a second memory page having the second usage order value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
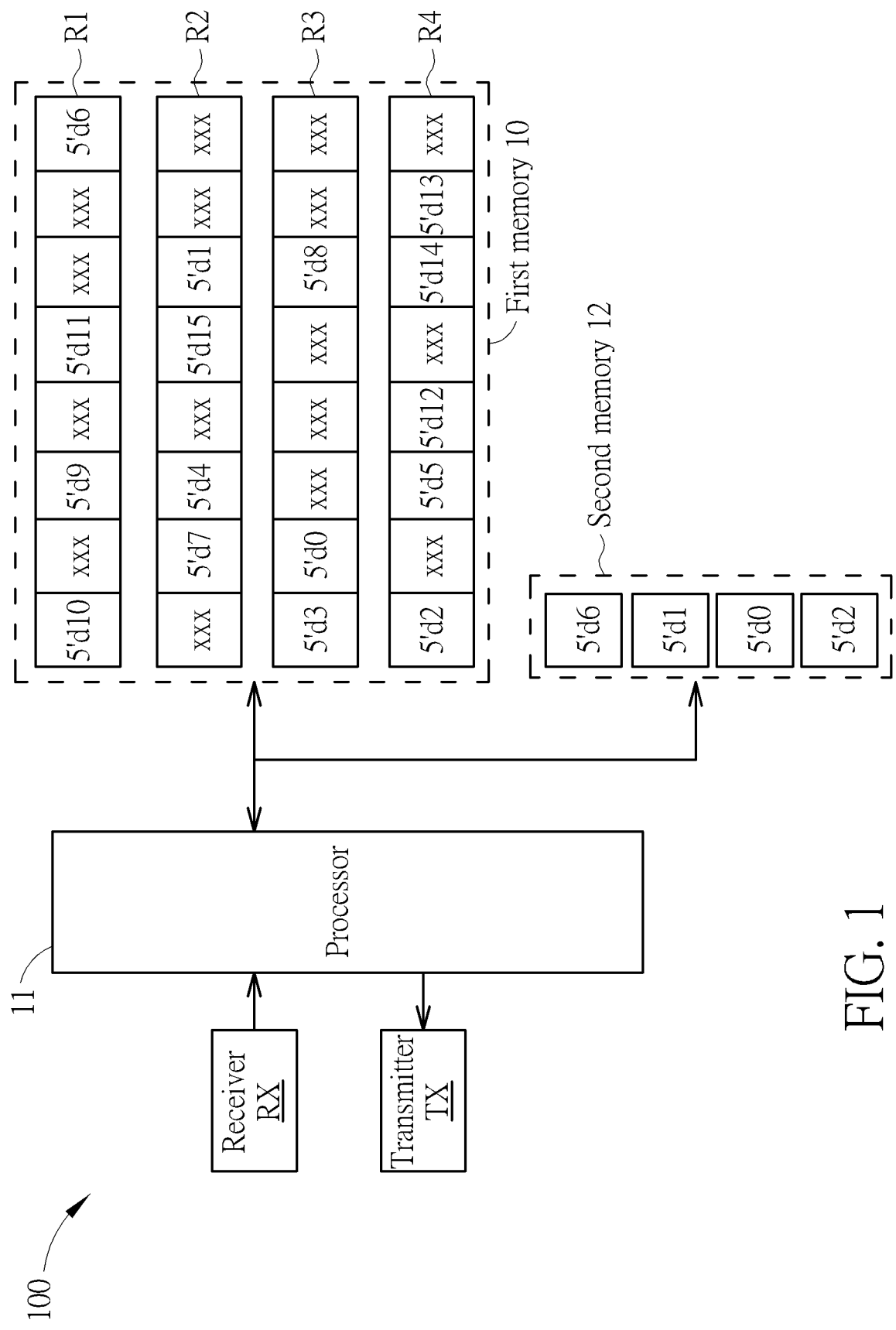
FIG. 1 illustrates a block diagram of a data accessing system according to an embodiment of the present invention.

FIG. 1 illustrates a block diagram of a data accessing system 100 according to an embodiment of the present invention. The data accessing system 100 includes a first memory 10, a receiver RX, a transmitter TX, and a processor 11. The first memory 10 includes a plurality of memory pages for saving data. The first memory 10 can be a static random access memory (SRAM). Particularly, the first memory 10 can include two-dimensional memory pages. For example, in FIG. 1, the first memory 10 can include memory pages R1 in a first row, memory pages R2 in a second row, memory pages R3 in a third row, and memory pages R4 in a fourth row. The plurality of memory pages in the first memory 10 can include at least one available memory page and/or at least one unavailable (or say, already used) memory page. In the first memory 10, the available memory page has a usage order value. The unavailable memory page has no usage order value. For example, the memory pages R1 in the first row include available memory pages having usage order values 5'd10, 5'd9, 5'd11, and 5'd6. The memory pages R2 in the second row include available memory pages having usage order values 5'd7, 5'd4, 5'd15, and 5'd1. The memory pages R3 in the third row include available memory pages having usage order values 5'd3, 5'd0, and 5'd8. The memory pages R4 in the fourth row include available memory pages having usage order values 5'd2, 5'd5, 5'd12, 5'd14, and 5'd13. As shown in FIG. 1, the memory pages having usage order values 5'd0 to 5'd15 are indicated as a memory page sequence for accessing data by the receiver RX or the transmitter TX. Further, for the first memory 10, the memory pages having usage order values 5'd0 to 5'd15 can be consecutive memory pages or discrete memory pages. In the data accessing system 100, the receiver RX is used for receiving input data and writing the input data to the first memory 10. The transmitter RX is used for reading output data from the first memory 10. The processor 11 is coupled to the first memory 10, the receiver RX, and the transmitter TX for controlling the first memory 10, the receiver RX, and the transmitter TX. The processor 11 can be a frame page order link controller. In the data accessing system 100, a second memory 12 can be introduced. The second memory 12 is coupled to the first memory 10 and the processor 11. The second memory 12 can be a register for buffering a usage order having a highest priority of the memory pages in each row. Further, in the data accessing system 100, when the receiver RX or the transmitter TX uses the memory pages sequentially, data stored in the first memory 10 and the second memory 12 is also updated synchronously. In the data accessing system 100, the processor 11 can acquire a usage order value of each memory page of the plurality of memory pages. Then, the processor 11 can acquire a first usage order value having a highest priority from the plurality of usage order values corresponding to the plurality of memory pages in the first memory 10. The transmitter TX and the receiver RX can access data through a first memory page having the first usage order value. After the processor 11 uses the first memory page having the first usage order value, the first memory 10 and the second memory 12 can be updated synchronously. After the first memory 10 and the second memory 12 are updated synchronously, the processor 11 can acquire a second usage order value having a highest priority from the updated first memory. The transmitter TX and the receiver RX can access data through a second memory page having the second usage order value. Details of searching appropriate memory pages for accessing data in the data accessing system 100 are illustrated later.

Figure 2:
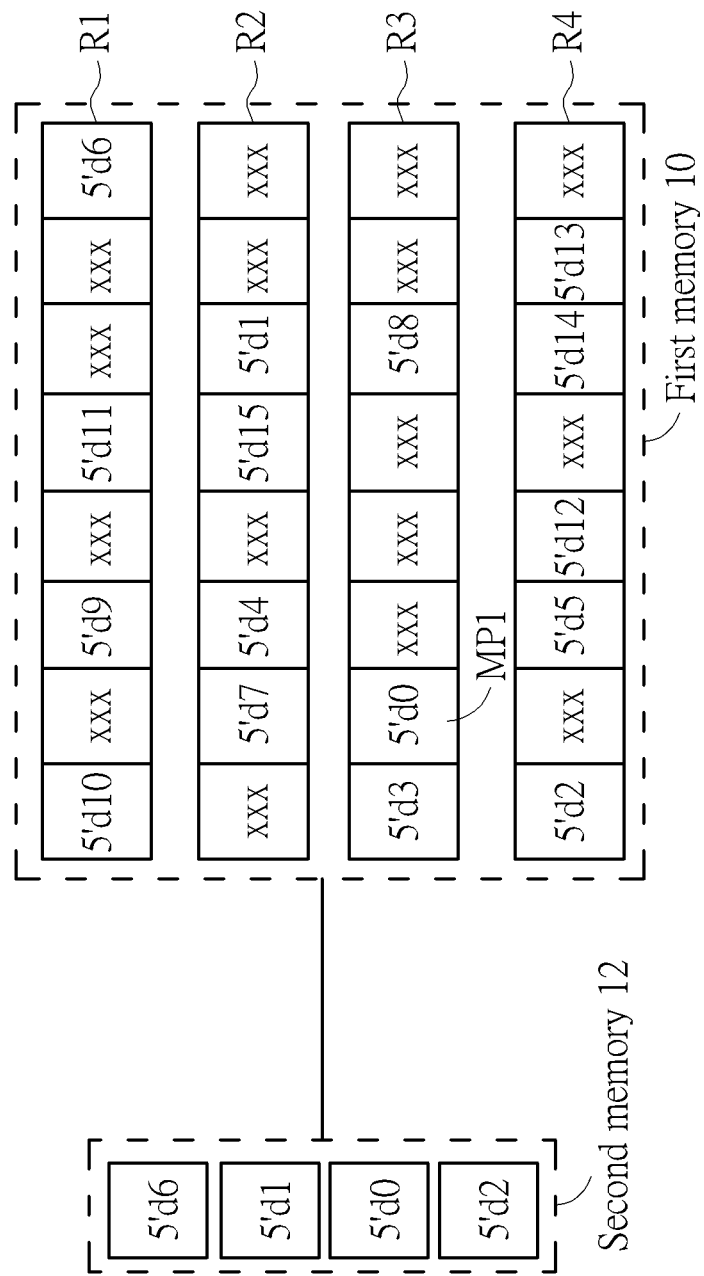
FIG. 2 is an illustration of acquiring a first usage order value having a highest priority from a first memory of the data accessing system in FIG. 1.

FIG. 2 is an illustration of acquiring the first usage order value having the highest priority from the first memory 10 of the data accessing system 100. As previously illustrated, in the data accessing system 100, the first memory 10 can include the memory pages R1 in the first row, the memory pages R2 in the second row, the memory pages R3 in the third row, and the memory pages R4 in the fourth row. The processor 11 can acquire a minimum row usage order value of usage order values in each row of the plurality of usage order values in the first memory 10. For example, the memory pages R1 in the first row include available memory pages having usage order values 5'd10, 5'd9, 5'd11, and 5'd6. The processor 11 can select a usage order value having the highest priority from a usage order value set {5'd10, 5'd9, 5'd11, 5'd6}. In other words, the processor 11 can select a minimum row usage order value 5'd6 from the memory pages R1 in the first row. The memory pages R2 in the second row include available memory pages having usage order values 5'd7, 5'd4, 5'd15, and 5'd1. The processor 11 can select a usage order value having the highest priority from a usage order value set {5'd7, 5'd4, 5'd15, 5'd1}. In other words, the processor 11 can select a minimum row usage order value 5'd1 from the memory pages R2 in the second row. The memory pages R3 in the third row include available memory pages having usage order values 5'd3, 5'd0, and 5'd8. The processor 11 can select a usage order value having the highest priority from a usage order value set {5'd3, 5'd0, and 5'd8}. In other words, the processor 11 can select a minimum row usage order value 5'd0 from the memory pages R3 in the third row. The memory pages R4 in the fourth row include available memory pages having usage order values 5'd2, 5'd5, 5'd12, 5'd14, and 5'd13. The processor 11 can select a usage order value having the highest priority from a usage order value set {5'd2, 5'd5, 5'd12, 5'd14, and 5'd13}. In other words, the processor 11 can select a minimum row usage order value 5'd2 from the memory pages R4 in the fourth row. Further, the processor 11 can use the second memory 12 for buffering the minimum row usage order value of the usage order values in each row. For example, in the memory pages R1 in the first row, the minimum row usage order value 5'd6 can be buffered as a first value of the second memory 12. In the memory pages R2 in the second row, the minimum row usage order value 5'd1 can be buffered as a second value of the second memory 12. In the memory pages R3 in the third row, the minimum row usage order value 5'd0 can be buffered as a third value of the second memory 12. In the memory pages R4 in the fourth row, the minimum row usage order value 5'd2 can be buffered as a fourth value of the second memory 12. Further, the processor 11 can acquire a minimum usage order value from the second memory 12 as the first usage order value. For example, after the second memory 12 buffers a usage order value set {5'd6, 5'd1, 5'd0, 5'd2}, the processor 11 can select a minimum usage order value 5'd0 as the first usage order value from the usage order value set {5'd6, 5'd1, 5'd0, 5'd2}. Therefore, the first memory page MP1 having the first usage order value 5'd0 can be regarded as a memory page having the highest priority of the first memory 10 accessed by the transmitter TX and the receiver RX.

Figure 3:
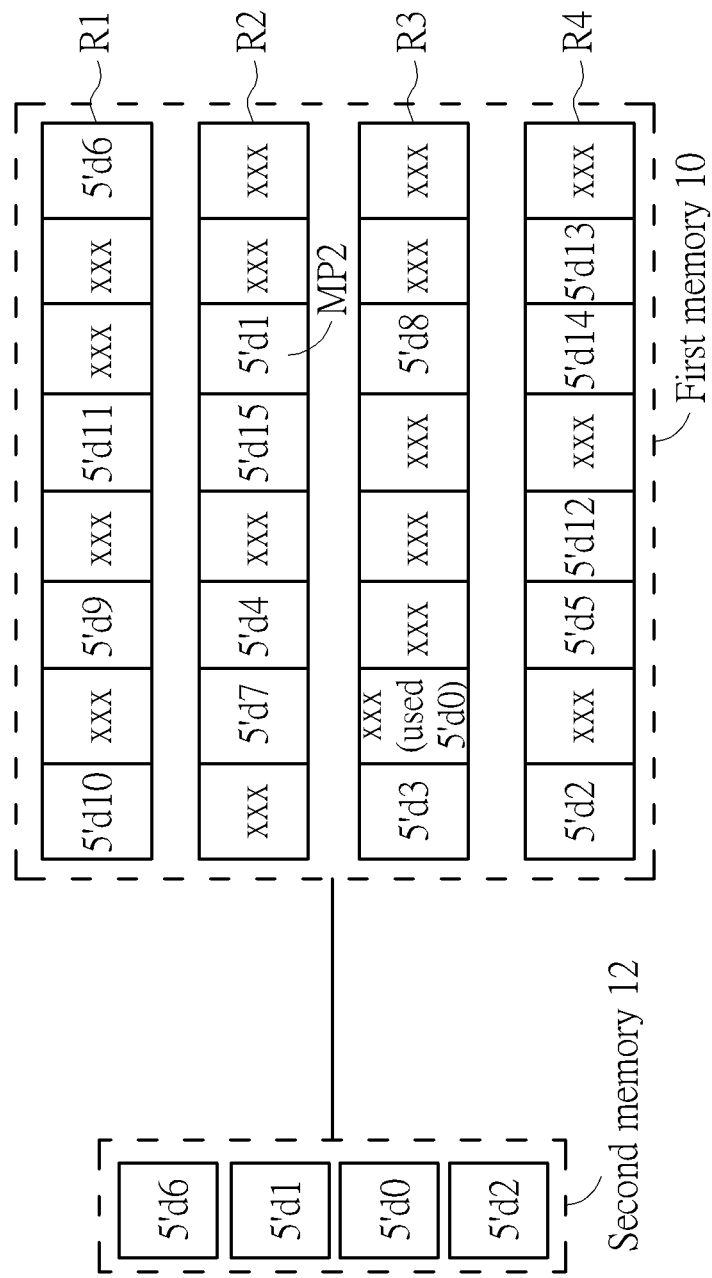
FIG. 3 is an illustration of acquiring a second usage order value having the highest priority from the first memory of the data accessing system in FIG. 1 after the first memory is updated.

FIG. 3 is an illustration of acquiring a second usage order value 5'd1 having the highest priority from the first memory 10 of the data accessing system 100 after the first memory 10 is updated. Based on the aforementioned process, after the processor 11 selects the minimum usage order value 5'd0 as the first usage order value from the usage order value set {5'd6, 5'dl, 5'd0, 5'd2}, the processor 11 can update the first memory 100. For example, after the first memory page MP1 having the first usage order value 5'd0 of the first memory 10 is used, the first memory page MP1 can be set to an unavailable state. Therefore, the usage order value of the first memory page MP1 can be set to "XXX" for indicating that the first memory page MP1 having the usage order value "XXX" is not a candidate memory page anymore. Further, after the first memory 10 is updated, the processor 11 can acquire a minimum row usage order value of usage order values in each row of the plurality of usage order values in the "updated" first memory 10 again. In FIG. 3, the first memory 10 only changes the usage order value 5'd0 (i.e., re-set to "xxx") of the memory pages R3 in the third row. Therefore, the usage order value set {5'd10, 5'd9, 5'd11, 5'd6} of the memory pages R1 in the first row, the usage order value set {5'd7, 5'd4, 5'd15, 5'd1} of the memory pages R2 in the second row, and the usage order value set {5 'd2, 5' d5, 5'd14, 5'd13} of the memory pages R4 in the fourth row are maintained. In other words, the memory pages R1 in the first row including the memory page having the usage order value 5'd6 saved as the first value of the second memory 12, the memory pages R2 in the second row including the memory page having the usage order value dl saved as the second value of the second memory 12, and the memory pages R4 in the fourth row including the memory page having the usage order value 5'd2 saved as the fourth value of the second memory 12 are maintained after the first memory 10 is updated. However, since the usage order value set of the third memory pages R3 is updated as { 5'd3, 5'd8}, the processor 11 can select a minimum row usage order value 5'd3 from the usage order value set {5'd3, 5'd8} of the memory pages R3 in the third row. Further, in the memory pages R3 of the third row, the minimum row usage order value 5'd3 can be buffered as the third value of the second memory 12. Therefore, the usage order value set {5'd6, 5'dl, 5'd0, 5'd2} buffered in the second memory 12 can be updated as {5'd6, 5'dl, 5'd3, 5'd2}. Similarly, the processor 11 can select a minimum usage order value 5'd1 from the usage order value set {5'd6, 5'd1, 5'd3, 5'd2} as the second usage order value. Therefore, the second memory page MP2 having the second usage order value 5'd1 can be regarded as a memory page having the highest priority of the "updated" first memory 10 accessed by the transmitter TX and the receiver RX. Further, after the second memory page MP2 having the second usage order value 5'd1 of the first memory 10 is used, the second memory page MP2 can be set to the unavailable state. Therefore, the usage order value of the second memory page MP2 can be set to "XXX" for indicating that the second memory page MP2 having the usage order value "XXX" is not a candidate memory page anymore. Similarly, after the first memory 10 and the second memory 12 are updated again, the processor 11 can select a memory page having a usage order value 5'd2. Then, the memory page having the usage order value 5'd2 is prepared to be accessed by the transmitter TX and the receiver RX. Therefore, since the first memory 10 can be combined with the second memory 12 for quickly searching an appropriate memory page to be accessed by the transmitter TX and the receiver RX according to the usage order values corresponding to the plurality of memory pages, the data accessing system 100 can reduce the memory capacity required to save pointers and can further reduce time complexity.

Further, after the first memory 10 is used, when all memory pages in a certain row of the first memory 10 are unavailable, the certain row can be labeled as a null row for reducing a scanning dimension. For example, after the first memory 10 and the second memory 12 are updated several times, when all memory pages in a certain row of the first memory 10 have usage order values "XXX", it implies that all memory pages in the certain row are unavailable. Therefore, the processor 11 can label the certain row as a null row. Since the null row is unprocessed, the search dimension and the time complexity can be reduced. Further, as previously mentioned, for the first memory 10, the memory pages having usage order values 5'd0 to 5'd15 can be consecutive memory pages or discrete memory pages. Further, in the data accessing system 100, the processor 11 can convert the plurality of memory pages in the first memory 10 to a plurality of consecutive memory pages or a plurality of discrete memory pages according to a mapping table. Any reasonable hardware or technology modification falls into the scope of the present invention.

Figure 4:
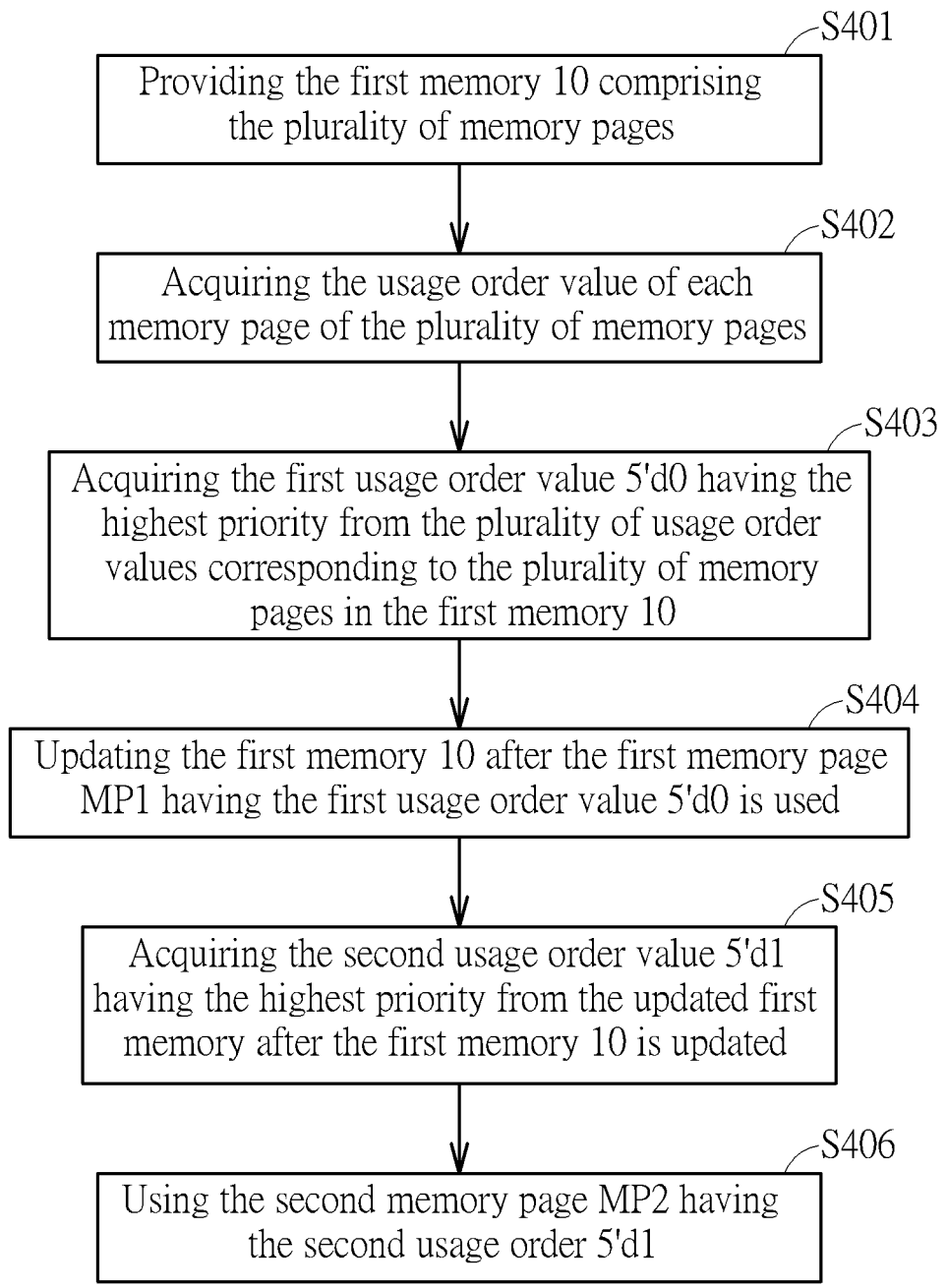
FIG. 4 is a flow chart of performing a data accessing method by the data accessing system in FIG. 1.

FIG. 4 is a flow chart of performing a data accessing method by the data accessing system 100. The data accessing method includes step S401 to step S406. Any reasonable step modification falls into the scope of the present invention. Step S401 to step S406 are illustrated below.

step S401: providing the first memory 10 comprising the plurality of memory pages;
step S402: acquiring the usage order value of each memory page of the plurality of memory pages;
step S403: acquiring the first usage order value 5'd0 having the highest priority from the plurality of usage order values corresponding to the plurality of memory pages in the first memory 10;
step S404: updating the first memory 10 after the first memory page MP1 having the first usage order value 5'd0 is used;
step S405: acquiring the second usage order value 5'd1 having the highest priority from the updated first memory after the first memory 10 is updated;
step S406: using the second memory page MP2 having the second usage order 5'd1.

Details of step S401 to step S406 are previously illustrated. Thus, they are omitted here. By using step S401 to step S406, the data accessing system 100 can quickly search an appropriate memory page to be accessed by the transmitter TX and the receiver RX according to the usage order values corresponding to the plurality of memory pages. Therefore, the data accessing system 100 can reduce the memory capacity required to save pointers and can further reduce time complexity.

To sum up, the present invention discloses a data accessing method and a data accessing system. The static random access memory of the data accessing system includes a plurality of memory pages and their usage order values. The data accessing system can use the usage order values and a register space for quickly searching an appropriate memory page to be accessed by the transmitter and the receiver. Further, the data accessing system can synchronously update contents stored in the static random access memory and the register space. Unlike conventional linked list structure, the data accessing system can process memory pages having usage order values. Therefore, the data accessing system can reduce the memory capacity required to save pointers and can further reduce time complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data accessing method comprising:
providing a first memory comprising a plurality of memory pages;
acquiring a usage order value of each memory page of the plurality of memory pages in the first memory;
acquiring a first usage order value having a highest priority from a plurality of usage order values each corresponding to each of the respective plurality of memory pages in the first memory;
updating the first memory after a first memory page of the plurality of memory pages of the first memory having the first usage order value is used;
acquiring a second usage order value having a highest priority from remaining memory pages of the plurality of memory pages of the first memory after the first memory is updated following usage of the first memory page; and
using a second memory page of the first memory having the second usage order;
wherein the plurality of memory pages are two-dimensional memory pages.

2. The method of claim 1, wherein acquiring the first usage order value having the highest priority from the plurality of usage order values each corresponding to each of the respective plurality of memory pages in the first memory comprises:
acquiring a minimum row usage order value of usage order values in each row of the plurality of usage order values in the first memory;

buffering the minimum row usage order value of the usage order values in each row to a second memory; and acquiring a minimum usage order value from the second memory as the first usage order value.

3. The method of claim 2, further comprising:

updating a plurality of usage order values buffered in the second memory after the first memory is updated; and after the first memory page having the first usage order value is used, setting the first memory page to an unavailable state for updating the first memory.

4. The method of claim 1, wherein acquiring the second usage order value having the highest priority from the remaining memory pages of the plurality of memory pages of the first memory after the first memory is updated following usage of the first memory page comprises:

acquiring a minimum row usage order value of usage order values in each row from the remaining memory pages of the plurality of memory pages having the plurality of usage order values in the first memory;

buffering the minimum row usage order value of the usage order values in each row to a second memory; and acquiring a minimum usage order value from the second memory as the second usage order value.

5. The method of claim 4, further comprising after the second memory page having the second usage order value is used, setting the second memory page to an unavailable state for updating the second memory.

6. The method of claim 1, further comprising:

converting the plurality of memory pages in the first memory to a plurality of consecutive memory pages or a plurality of discrete memory pages according to a mapping table.

7. The method of claim 1, wherein the plurality of memory pages in the first memory comprises at least one available memory page and at least one unavailable memory page, and the at least one unavailable memory page has no usage order value.

8. The method of claim 1, wherein the first memory is a static random access memory (SRAM), and the second memory is a register.

9. The method of claim 1, further comprising after the first memory is updated, when all memory pages in a certain row of the first memory are unavailable, labeling the certain row as a null row for reducing a scanning dimension.

10. A data accessing system comprising:

a first memory comprising a plurality of memory pages and configured to save data;

a receiver configured to receive input data and write the input data to the first memory;

a transmitter configured to read output data from the first memory; and a processor coupled to the first memory, the receiver, and the transmitter and configured to control the first memory, the receiver, and the transmitter;

wherein the processor acquires a usage order value of each memory page of the plurality of memory pages in the first memory, the processor acquires a first usage order value having a highest priority from a plurality of usage order values each corresponding to each of the plurality of memory pages in the first memory, the transmitter and the receiver access data through accessing a first memory page of the plurality of memory pages of the first memory having the first usage order value, the processor updates the first memory after the first memory page of the plurality of memory pages of the first memory having the first usage order value is used, the processor acquires a second usage order value having a highest priority from remaining memory pages of the plurality of memory pages of the first memory following usage of the first memory page, the transmitter and the receiver access data through a second memory page of the first memory having the second usage order value, and the plurality of memory pages are two-dimensional memory pages.

11. The system of claim 10, wherein the processor acquires a minimum row usage order value of usage order values in each row of the plurality of usage order values in the first memory, a second memory is configured to buffer the minimum row usage order value of the usage order values in each row, and the processor acquires a minimum usage order value from the second memory as the first usage order value.

12. The system of claim 11, the processor updates a plurality of usage order values buffered in the second memory after the first memory is updated, and after the first memory page having the first usage order value is used, the first memory page is set to an unavailable state for updating the first memory.

13. The system of claim 10, wherein the processor acquires a minimum row usage order value of usage order values in each row from the remaining memory pages of the plurality of memory pages having the plurality of usage order values in the first memory, a second memory is configured to buffer the minimum row usage order value of the usage order values in each row, and the processor acquires a minimum usage order value from the second memory as the second usage order value.

14. The system of claim 13, wherein after the second memory page having the second usage order value is used, the second memory page is set to an unavailable state for updating the second memory.

15. The system of claim 10, wherein the processor converts the plurality of memory pages in the first memory to a plurality of consecutive memory pages or a plurality of discrete memory pages according to a mapping table.

16. The system of claim 10, wherein the plurality of memory pages in the first memory comprises at least one available memory page and at least one unavailable memory page, and the at least one unavailable memory page has no usage order value.

17. The system of claim 10, wherein the first memory is a static random access memory (SRAM), and the second memory is a register.

18. The system of claim 10, wherein after the first memory is updated, when all memory pages in a certain row of the first memory are unavailable, the certain row is labeled as a null row for reducing a scanning dimension.

* * * * *